US012332650B2

(12) United States Patent
Cui et al.

(10) Patent No.: US 12,332,650 B2
(45) Date of Patent: Jun. 17, 2025

(54) TRAVERSAL METHOD AND SYSTEM, ROBOT, AND READABLE STORAGE MEDIUM

(71) Applicant: Suzhou Cleva Precision Machinery & Technology Co., Ltd., Suzhou (CN)

(72) Inventors: Jiangwei Cui, Suzhou (CN); Lichao Yuan, Suzhou (CN)

(73) Assignee: Suzhou Cleva Precision Machinery and Technology Co., Ltd., Suzhou (CN)

( * ) Notice: Subject to any disclaimer, the term of this patent is extended or adjusted under 35 U.S.C. 154(b) by 154 days.

(21) Appl. No.: 17/767,998

(22) PCT Filed: Aug. 13, 2020

(86) PCT No.: PCT/CN2020/108823
§ 371 (c)(1),
(2) Date: Apr. 11, 2022

(87) PCT Pub. No.: WO2021/135248
PCT Pub. Date: Aug. 7, 2021

(65) Prior Publication Data
US 2024/0085919 A1  Mar. 14, 2024

(30) Foreign Application Priority Data
Dec. 24, 2019 (CN) .......................... 201911344487.4

(51) Int. Cl.
*G05D 1/00* (2024.01)
*G05B 19/4155* (2006.01)

(52) U.S. Cl.
CPC ....... *G05D 1/0219* (2013.01); *G05B 19/4155* (2013.01); *G05B 2219/50391* (2013.01)

(58) Field of Classification Search
CPC .......................... G05D 1/0219; G05B 19/4155
See application file for complete search history.

(56) References Cited

U.S. PATENT DOCUMENTS

| 10,882,187 B2 | 1/2021 | YongYong et al. |
| 2019/0061156 A1* | 2/2019 | Li ........................... G05D 1/027 |
| 2020/0178748 A1* | 6/2020 | Han ......................... A47L 9/28 |

FOREIGN PATENT DOCUMENTS

| CN | 107368079 A | 11/2017 |
| CN | 109540155 A | 3/2019 |

(Continued)

OTHER PUBLICATIONS

International Search Report for Application No. PCT/CN2020/1088823, dated Oct. 26, 2020.

*Primary Examiner* — Jason Holloway
*Assistant Examiner* — Christopher A Buksa
(74) *Attorney, Agent, or Firm* — JK Intellectual Property Law, PA

(57) ABSTRACT

A traversal method and system, a robot, and a readable storage medium are disclosed, wherein the method may include: acquiring a grid map and establishing the rectangular coordinate system covering the grid map; and if traversal is performed for the first time, driving the robot to arrive at the starting point, and driving the robot to, according to a randomly selected preset rule, traverse the working region in which the starting point is located and work synchronously; when it is confirmed that the current preset rule applied to the first traversal cannot continue to be executed, acquiring the area of each independent working region in the remaining working region, if the area of any independent working region is not less than a preset area threshold, selecting any coordinate point as a working start point in the working region the area of which is not less than the preset area threshold, driving the robot to arrive at the working start point, and, starting from the working start point, randomly selecting the preset rule to perform traversal and work synchronously until the areas of all the independent working regions are less than the preset area threshold (Continued)

(S3). The present disclosure beneficially improves the traversal ability and work efficiency of the robot.

13 Claims, 8 Drawing Sheets

(56) References Cited

FOREIGN PATENT DOCUMENTS

| | | | |
|---|---|---|---|
| CN | 110398964 A | 11/2019 | |
| CN | 110456789 A | 11/2019 | |
| CN | 110488820 A | 11/2019 | |
| JP | 2003266349 A | 9/2003 | |
| WO | WO-2020107007 A1 * | 5/2020 | ........... A47L 9/2805 |

* cited by examiner

TRAVERSAL METHOD AND SYSTEM, ROBOT, AND READABLE STORAGE MEDIUM

CROSS-REFERENCE TO RELATED PATENT APPLICATIONS

This application is a national stage of International Application No. PCT/CN2020/108823, filed on Aug. 13, 2020, which claims priority to CN patent application No. 201911344487.4, filed on Dec. 24, 2019. All of the aforementioned applications are hereby incorporated by reference in their entireties.

TECHNICAL FIELD

The present disclosure relates to the field of intelligent control, and in particular to a traversal method and system, a robot, and a readable storage medium.

BACKGROUND

Low repetition rate and high coverage rate are the goals pursued by moving robots such as traversing robots for dust absorption, mowing and swimming pool cleaning.

Taking an intelligent robot mower as an example, in order to improve the coverage rate and coverage efficiency of lawn mowing during the mowing process of the robot, the methods and steps usually used by the robot mower are: GPS, laser, UWB or other methods for positioning and establishing a lawn electronic map, then path planning, and finally path tracking to complete the traversal operation. However, in the case of controlled cost, the robot mower is usually not equipped with a high-performance controller, but a large amount of calculation and real-time control are required for path tracking, so if an ordinary controller is used, the shortcomings of slow running speed and distorted walking path will be caused, resulting in missed mowing. In addition, the ups and downs, softness and grass density of a lawn, the consistency of components, and the positioning accuracy all affect the path tracking accuracy of the robot mower to cause missed mowing, thereby reducing the coverage rate and coverage efficiency of the robot mower.

SUMMARY

In order to solve the above technical problems, the objectives of the present disclosure are to provide a traversal method and system, a robot, and a readable storage medium.

In order to achieve one of the above objectives of the present disclosure, an embodiment of the present disclosure provides a traversal method, the method comprising: acquiring a grid map, the grid map comprising a plurality of grid cells with the same structure, and the grid map being divided into a working region and a non-working region based on whether a robot works therein;

within the plane in which the grid map is located, selecting any point as a coordinate origin of a rectangular coordinate system, and using the coordinate origin to establish the rectangular coordinate system covering the grid map;

if traversal is performed for the first time in the same working cycle, randomly selecting a coordinate point in the working region as a starting point;

driving the robot to arrive at the starting point, and driving the robot to, according to a randomly selected preset rule, traverse the working region where the starting point is located and work synchronously; and when it is confirmed that the current preset rule applied to the first traversal cannot continue to be executed, acquiring the area of each independent working region in the remaining working region; if the area of any independent working region is not less than a preset area threshold, selecting any coordinate point as a working start point in the working region the area of which is not less than the preset area threshold, driving the robot to arrive at the working start point, and, starting from the working start point, randomly selecting the preset rule to perform traversal and work synchronously until the areas of all the independent working regions are less than the preset area threshold.

As a further improvement of an embodiment of the present disclosure, the method further comprises configuring the preset rule, the preset rule comprising: driving the robot to traverse the current working region in a bow-shaped manner or driving the robot to traverse the current working region in a spiral outward manner.

As a further improvement of an embodiment of the present disclosure, "the grid map being divided into a working region and a non-working region based on whether a robot works therein" specifically comprises:

marking the grid map with any two different identifiers, the two identifiers being represented by a first identifier and a second identifier respectively;

before the robot enters the grid map, the method further comprises: marking each grid cell of the working region with the first identifier, and marking each grid cell of the non-working region with the second identifier;

during the working process of the robot in the same working cycle, the method further comprises: if the robot completes the work in any grid cell, modifying the identifier of the current grid cell from the first identifier to the second identifier.

As a further improvement of an embodiment of the present disclosure, "within the plane in which the grid map is located, selecting any point as a coordinate origin of a rectangular coordinate system, and using the coordinate origin to establish the rectangular coordinate system covering the grid map" specifically comprises:

selecting any point outside the grid map as the coordinate origin of the rectangular coordinate system, and using two mutually perpendicular straight lines that pass through the coordinate origin and divide the grid map into the same quadrant as an X-axis and a Y-axis of the rectangular coordinate system respectively.

As a further improvement of an embodiment of the present disclosure, the method further comprises:

selecting any point outside the grid map as the coordinate origin of the rectangular coordinate system, and using two mutually perpendicular straight lines that pass through the coordinate origin and divide the grid map into a first quadrant as an X-axis and a Y-axis of the rectangular coordinate system respectively.

As a further improvement of an embodiment of the present disclosure, "within the plane in which the grid map is located, selecting any point as a coordinate origin of a rectangular coordinate system, and using the coordinate origin to establish the rectangular coordinate system covering the grid map" specifically comprises:

using the stop position of the robot at a charging pile as the coordinate origin; and using the open direction of the charging pile for charging the robot as an X-axis, and the direction in which the X-axis is rotated 90° as a Y-axis, to establish the rectangular coordinate system.

As a further improvement of an embodiment of the present disclosure, when the selected preset rule is driving the robot to traverse the current working region in a bow-shaped manner, the method for obtaining at least one of the starting point and the working start point comprises:

selecting an extreme value coordinate point in the current working region as the starting point, the extreme value coordinate point comprising: a coordinate point with a minimum abscissa on the X-axis, a coordinate point with a maximum abscissa on the X-axis, a coordinate point with a minimum ordinate on the Y-axis, or a coordinate point with a maximum ordinate on the Y-axis.

As a further improvement of an embodiment of the present disclosure, when the selected preset rule is driving the robot to traverse the current working region in a spiral outward manner, the method for obtaining at least one of the starting point and the working start point comprises:

selecting a coordinate point closest to the center of the working region as the starting point.

As a further improvement of an embodiment of the present disclosure, when the selected preset rule is driving the robot to traverse the current working region in a bow-shaped manner, the method for obtaining the working start point comprises:

selecting a coordinate point closest to the current position of the robot in the current working region as the working start point.

As a further improvement of an embodiment of the present disclosure, when the selected preset rule is traversal in a spiral outward manner, it is judged whether the diameter of the inscribed circle of the current working region is greater than a preset diameter threshold, if so, the traversal is performed according to the selected preset rule, otherwise, the preset result is changed to traversal in a bow-shaped manner, and the current region is traversed in the bow-shaped manner.

As a further improvement of an embodiment of the present disclosure, the method further comprises:

at the beginning of a next working cycle, restoring original data in the grid map;

during first traversal, after the starting point of the previous working cycle is excluded from the current working region, selecting any coordinate point as the working start point of this working cycle;

or during first traversal, different from the walking direction when the robot traverses for the first time in the previous working cycle, changing the walking direction when the robot traverses for the first time in this working cycle;

or during first traversal, different from the preset rule selected when the robot traverses for the first time in the previous working cycle, changing the preset rule when the robot traverses for the first time in this working cycle.

In order to achieve one of the above objectives of the present disclosure, an embodiment of the present disclosure provides a robot, comprising a memory and a processor, the memory storing a computer program, and when the processor executes the computer program, the steps of the traversal method as described above are implemented.

In order to achieve one of the above objectives of the present disclosure, an embodiment of the present disclosure provides a readable storage medium, storing a computer program thereon, when the computer program is executed by a processor, the steps of the traversal method as described above are implemented.

In order to achieve another objective of the above disclosure, an embodiment of the present disclosure provides a traversal system, the system comprising: an acquisition module, configured to acquire a grid map, the grid map comprising a plurality of grid cells with the same structure, and the grid map being divided into a working region and a non-working region based on whether a robot works therein;

a coordinate system establishment module, configured to select any point within the plane in which the grid map is located as a coordinate origin of a rectangular coordinate system, and use the coordinate origin to establish the rectangular coordinate system covering the grid map; and an analysis processing module, configured to randomly select a coordinate point in the working region as a starting point if traversal is performed for the first time in the same working cycle, drive the robot to arrive at the starting point, and drive the robot, according to a randomly selected preset rule, traverse the working region where the starting point is located and work synchronously, and when it is confirmed that the current preset rule applied to the first traversal cannot continue to be executed, acquire the area of each independent working region in the remaining working region; if the area of any independent working region is not less than a preset area threshold, select any coordinate point as a working start point in the working region the area of which is not less than the preset area threshold, drive the robot to arrive at the working start point of the current working region, and corresponding to the current working region, starting from the working start point, randomly select the preset rule to perform traversal and work synchronously until the areas of all the independent working regions are less than the preset area threshold.

Compared with the prior art, the traversal method and system, robot and readable storage medium of the present disclosure have the advantages that a working region is traversed in bow-shaped and spiral outward manners in combination with grid map coordinates in a rectangular coordinate system, and the remaining working region is checked according to the area and traversed, thereby forming an efficient traversal method, which ensures the coverage rate of the robot during traversal, helps to improve the efficiency of the robot during work, and effectively avoids missed mowing.

DETAILED DESCRIPTION

The present disclosure will be described in detail below with reference to various embodiments shown in the accompanying drawings. However, these embodiments do not limit the present disclosure. Structures, methods, or functional transformations made by those of ordinary skill in the art based on these embodiments are all included within the protection scope of the present disclosure.

The robot system of the present disclosure may be a robot mower system, or a sweeping robot system, etc., which automatically travels in a working region to mow and absorb dust. In specific examples of the present disclosure, the robot mower system is taken as an example for detailed description. Correspondingly, the working region may be a lawn.

Figure 1:
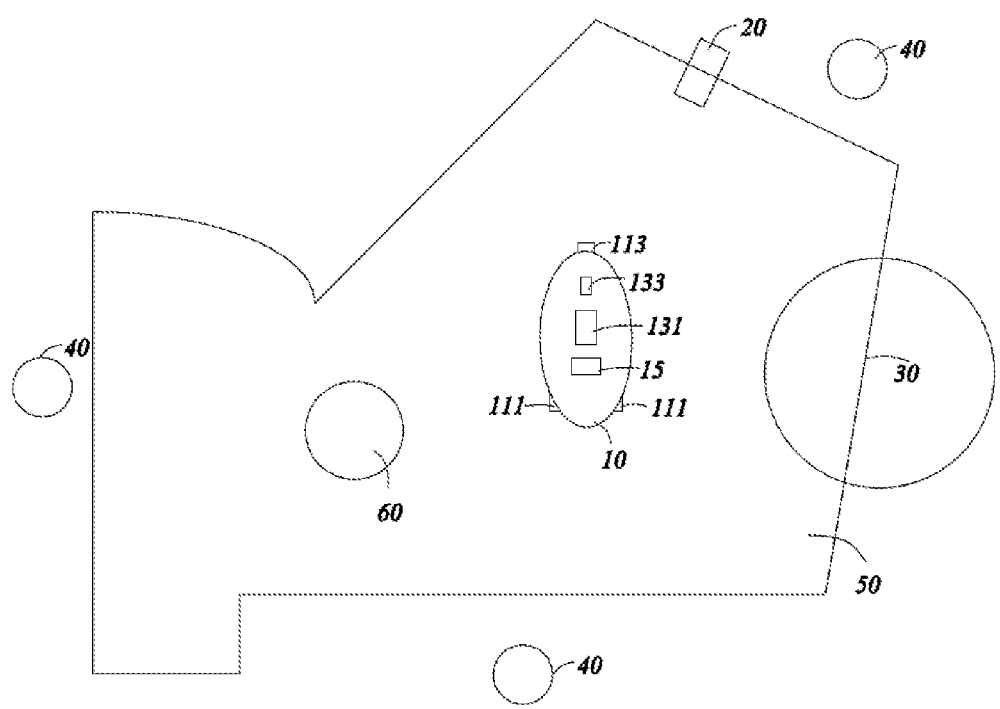
FIG. 1 is a schematic structural diagram of a robot mower system of the present disclosure.

As shown in FIG. 1, the robot mower system of the present disclosure comprises: a robot mower (RM), a charging station 20, a boundary line 30, a boundary line signal station and a positioning base station 40.

The robot mower comprises: a main body 10, and a walking unit and a control unit that are arranged on the main body 10. The walking unit comprises: driving wheels 111, a driven wheel(s) 113 and a motor for driving the driving wheels 111; the motor may be a brushless motor with a reduction box and a Hall sensor; after the motor is started, the driving wheels 111 can be driven to travel by the reduction box, and can run straight forward and backward, turn on site, run in an arc manner, etc. by controlling the speed and direction of the two wheels; and the driven wheel(s) 113 may be a universal wheel(s), the number of which is usually 1 or 2, for supporting balance.

The control unit comprises at least: a data memory 131, configured to store various information obtained during the walking process of the robot along a line patrol path. The data memory is, for example, an EPROM, a Flash or an SD card.

The boundary line 30 is, for example, a power-on wire, the boundary line signal station is usually integrated in the charging station, and the positioning base station 40 is usually a signal transmitting station based on technologies such as infrared, ultrasonic, Bluetooth, ZigBee, and UWB, or a reflective beacon adapted to a laser transmitter on the RM; the charging station 20 is usually arranged on the boundary line; the control unit of the RM further comprises: a boundary sensor and a positioning sensor 133; the boundary sensor is usually an inductor for sensing signals loaded on the boundary line; and the positioning sensor 133 is usually a sensor that receives infrared, ultrasonic, Bluetooth, ZigBee, and UWB signals, or a laser transmitter/receiver comprising a turntable, and can receive signals sent or reflected from the positioning base station.

In this specific example, the positioning base station 40 is located on a lawn 50, and the number and position of the positioning base station 40 are usually configured according to the shape of the lawn and a power supply. In addition, obstacles 60 that need to prevent the robot mower from entering, such as a pool and flowers, are also arranged on the lawn 50.

Further, the robot mower also comprises: a working mechanism for working, and a power supply 15. In this embodiment, the working mechanism comprises a mowing cutter head, and various sensors for sensing the walking state of the walking robot, such as dumping, ground clearance and collision sensors, which will not be described in detail here.

Figure 2:
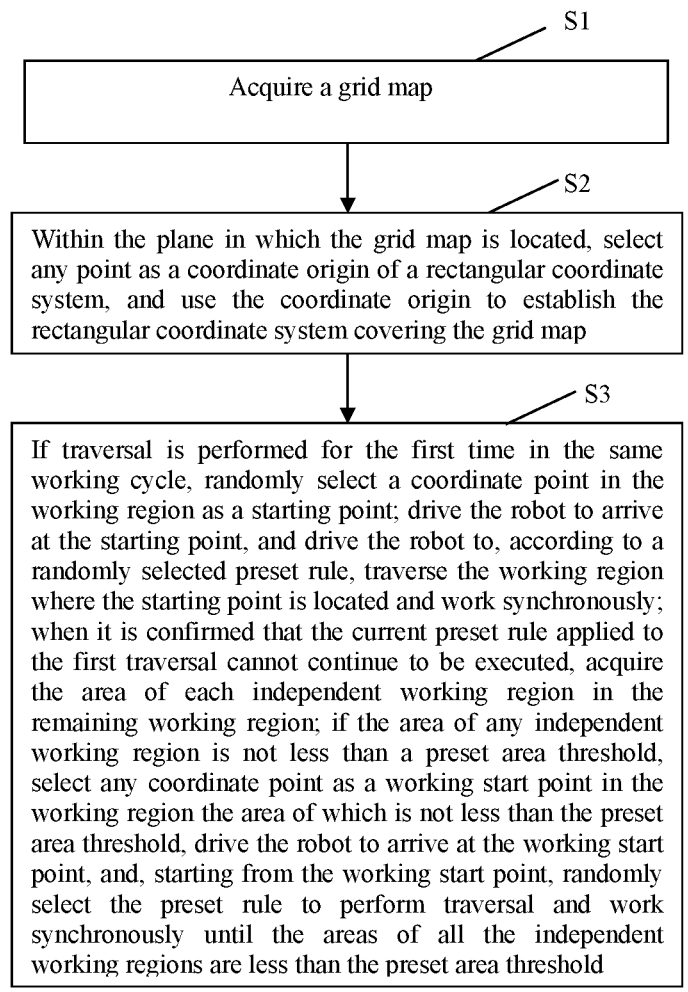
FIG. 2 is a schematic flowchart of a traversal method provided by an embodiment of the present disclosure.

As shown in FIG. 2, a traversal method provided by an embodiment of the present disclosure comprises the following steps:

S1, acquiring a grid map, the grid map comprising a plurality of grid cells with the same structure, and the grid map being divided into a working region and a non-working region based on whether a robot works therein;

S2, within the plane in which the grid map is located, selecting any point as a coordinate origin of a rectangular coordinate system, and using the coordinate origin to establish the rectangular coordinate system covering the grid map;

S3, if traversal is performed for the first time in the same working cycle, randomly selecting a coordinate point in the working region as a starting point;

The robot is driven to arrive at the starting point, and the robot is driven to, according to a randomly selected preset rule, traverse the working region where the starting point is located and work synchronously, the preset rule comprising: driving the robot to traverse the current working region in a bow-shaped manner or driving the robot to traverse the current working region in a spiral outward manner;

When it is confirmed that the current preset rule applied to the first traversal cannot continue to be executed, the area of each independent working region in the remaining working region is acquired; if the area of any independent working region is not less than a preset area threshold, any coordinate point is selected as a working start point in the working region the area of which is not less than the preset area threshold, the robot is driven to arrive at the working start point, and, starting from the working start point, the preset rule is randomly selected to perform traversal and work synchronously until the areas of all the independent working regions are less than the preset area threshold.

For step S1, there are various ways to create the grid map, which have been clearly recorded in the prior art and will not be described in detail here.

In a specific embodiment of the present disclosure, step S1 specifically comprises: marking the grid map with any two different identifiers, the two identifiers being represented by a first identifier and a second identifier respectively;

Before the robot enters the grid map, the method further comprises: marking each grid cell of the working region with the first identifier, and marking each grid cell of the non-working region with the second identifier.

In addition, for other steps, during the working process of the robot in the same working cycle, the method further comprises: if the robot completes the work in any grid cell, the identifier of the current grid cell is modified from the first identifier to the second identifier.

In a specific example of the present disclosure, the working region and the non-working region are respectively marked by binary values "0" and "1"; "0" indicates the working region, that is, the region in the lawn that needs to be mowed; "1" indicates the non-working region, that is, the non-working region except the region that needs to be mowed; in the specific example shown in FIG. 1, the boundary line, the outside of the boundary line and the obstacles are all non-working regions; in addition, during the working process of the robot, the region where the mowing is completed will also be adjusted from the working region to the non-working region to facilitate the calculation of the remaining independent regions, which will be described in the following.

Corresponding to step S2, with respect to the establishment of the rectangular coordinate system, its main purpose is to record the specific position of each grid cell in the grid map in a relative reference manner, and to calculate the current position of the robot, the traveled position, and the positions to be traversed based on specific coordinate reference during the working process of the robot.

In a preferred embodiment of the present disclosure, step S2 specifically comprises: selecting any point outside the grid map as the coordinate origin of the rectangular coordinate system, and using two mutually perpendicular straight lines that pass through the coordinate origin and divide the grid map into the same quadrant as an X-axis and a Y-axis of the rectangular coordinate system respectively.

In this embodiment, the coordinate system is established based on the division of the grid map into the same quadrant of the coordinate system, which facilitates the confirmation of coordinates of each position of the grid cells.

Figure 3:
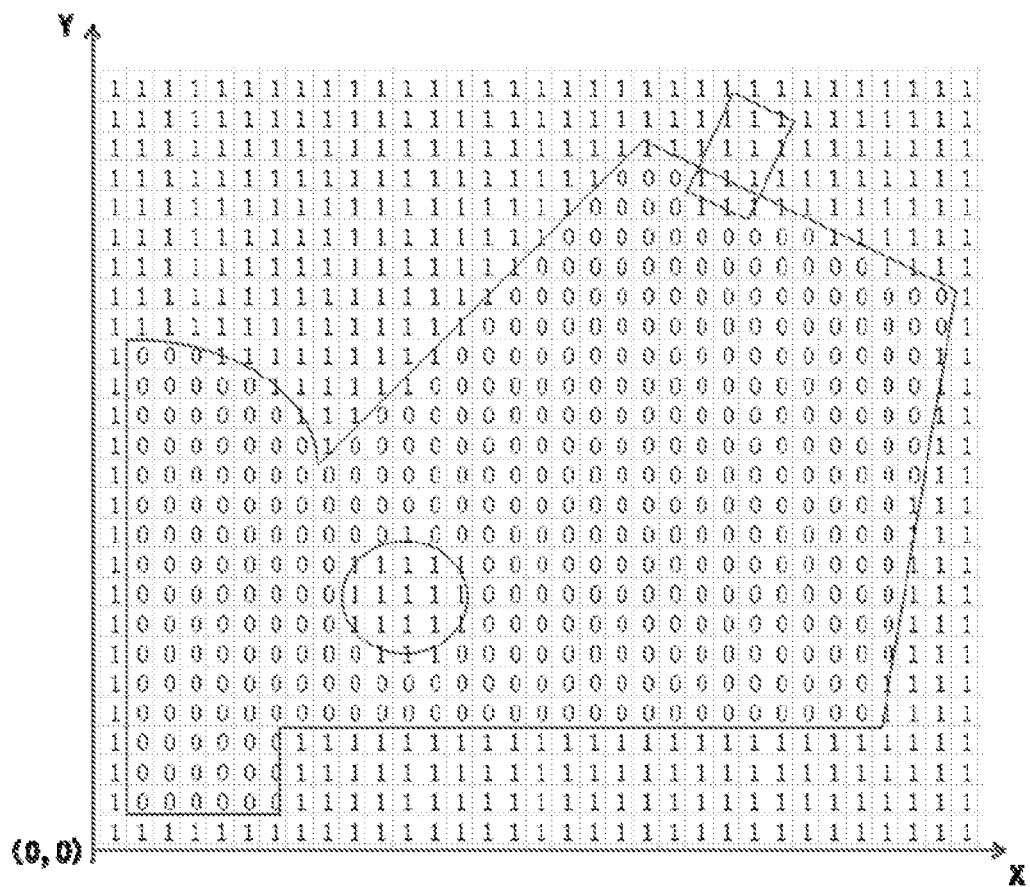
FIGS. 3, 4A, 4B, 4C, 4D, 5A, 5B, 5C, 6, 7A, 7B, and 7C are respectively schematic structural diagrams of a specific example of the present disclosure.

In a specific example of the present disclosure, as shown in FIG. 3, any point outside the grid map is selected as the coordinate origin of the rectangular coordinate system, and two mutually perpendicular straight lines that pass through the coordinate origin and divide the grid map into a first quadrant are used as an X-axis and a Y-axis of the rectangular coordinate system respectively.

In other embodiments of the present disclosure, step S2 comprises: using the stop position of the robot at a charging station as the coordinate origin; when viewed from the top, using the open direction of the charging station for charging the robot as an X-axis direction (that is, the direction in which the robot leaves the charging station), and using the direction in which the X-axis is rotated 90° as a Y-axis direction to establish the rectangular coordinate system. At this time, the position coordinates of the charging station are (0, 0).

For step S3, the present disclosure proposes a working cycle to represent the duration of one complete traversal of a working region. The complete traversal cut-off here refers to the cut-off when the current working region cannot be traversed using the preset rule.

The preset area may be set as needed, and its value is between 0 and the size of the working region traversed for the first time.

The traversal manner in the preset rule of the present disclosure may be implemented by global positioning and navigation carried by the robot. In the absence of global navigation, the robot may be driven by the wheel difference of two driving wheels and controlled by the built-in sensors of the robot.

In specific implementations of the present disclosure, there are various implementations for traversing in a "bow-shaped" manner or in a "spiral outward" manner.

Figure 4A:
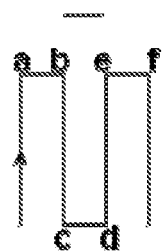
Figure 4B:
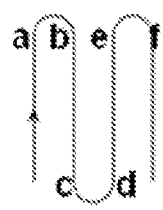
Figure 4C:
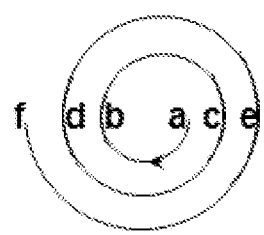
Figure 4D:
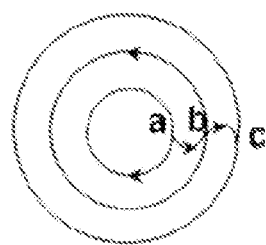

As shown in FIGS. 4A, 4B, 4C, and 4D, FIG. 4A shows a square bow-shaped traversal manner of a first embodiment of the present disclosure, where the traversal is performed in an order of a-b-c-d-e-f and implemented by straight walking and on-site turning of the robot; FIG. 4B shows a smooth bow-shaped traversal manner of a second embodiment of the present disclosure, where the traversal is performed in an order of a-b-c-d-e-f and implemented by straight walking and semi-arc motion of the robot; FIG. 4C shows a semi-circular connected spiral outward traversal manner of a third embodiment of the present disclosure, where the traversal is performed in an order of a-b-c-d-e-f and implemented by left-right alternating inside and outside semi-arc motion of the robot; and FIG. 4D shows a circular connected spiral outward traversal manner of a fourth embodiment of the present disclosure, where the traversal is performed in an order of a-b-c and implemented by circular motion and semi-arc motion of the robot.

For step S3, in a preferred embodiment of the present disclosure, when the selected preset rule is driving the robot to traverse the current working region in a bow-shaped manner, the method for obtaining at least one of the starting point and the working start point comprises: an extreme value coordinate point in the current working region is selected as the starting point, the extreme value coordinate point comprising: a coordinate point with a minimum abscissa on the X-axis, a coordinate point with a maximum abscissa on the X-axis, a coordinate point with a minimum ordinate on the Y-axis, or a coordinate point with a maximum ordinate on the Y-axis.

Preferably, when the selected preset rule is driving the robot to traverse the current working region in a spiral outward manner, the method for obtaining at least one of the starting point and the working start point comprises: a coordinate point closest to the center of the working region is selected as the starting point.

Further, with respect to the method for obtaining a working start point, in a preferred embodiment of the present disclosure, when the selected preset rule is driving the robot to traverse the current working region in a bow-shaped manner, a coordinate point closest to the current position of the robot in the current working region is selected as the working start point.

It should be noted that in the same working cycle, after the robot traverses the working region for the first time, the shape of each independent working region in the remaining working region is not fixed; when the shape of any independent region is approximately circular, the traversal in the spiral outward manner is more suitable; when the shape of any independent region is irregular, the traversal in the bow-shaped manner is more suitable; of course, this rule is also suitable for the first traversal; in addition, during the specific application of the present disclosure, the user can assist in setting preset rules for the robot, which will not be further described here.

Further, in a preferred embodiment of the present disclosure, when the selected preset rule is traversal in a spiral outward manner, it is judged whether the diameter of the inscribed circle of the current working region is greater than a preset diameter threshold, if so, the traversal is performed according to the selected preset rule, otherwise, the preset result is changed to traversal in a bow-shaped manner, and the current region is traversed in the bow-shaped manner. In this way, the current working region is traversed with the optimal design scheme. The preset diameter threshold in this embodiment is a fixed data, can be specifically set as needed, and is between 0 and the specific value of the diameter of the inscribed circle of the working region traversed for the first time.

Further, the method further comprises: at the beginning of a next working cycle, original data in the grid map is restored; during first traversal, after the starting point of the previous working cycle is excluded from the current working region, any coordinate point is selected as the working start point of this working cycle; or during first traversal, different from the walking direction when the robot traverses for the first time in the previous working cycle, the walking direction when the robot traverses for the first time in this working cycle is changed; or during first traversal, different from the preset rule selected when the robot traverses for the first time in the previous working cycle, the preset rule when the robot traverses for the first time in this working cycle is changed. In this way, when the same working region is mowed for many times, the selection of different traversal manners in adjacent working cycles can cover missed mowing that may be caused during last traversal using the built-in sensors due to the ups and downs of the lawn, uneven softness of the surface, density of grass, non-uniformity of parts, etc., achieve better mowing effect, and improve work efficiency.

In order to facilitate understanding, a number of specific examples are described in the following content for understanding the content of the present disclosure.

Figure 5A:
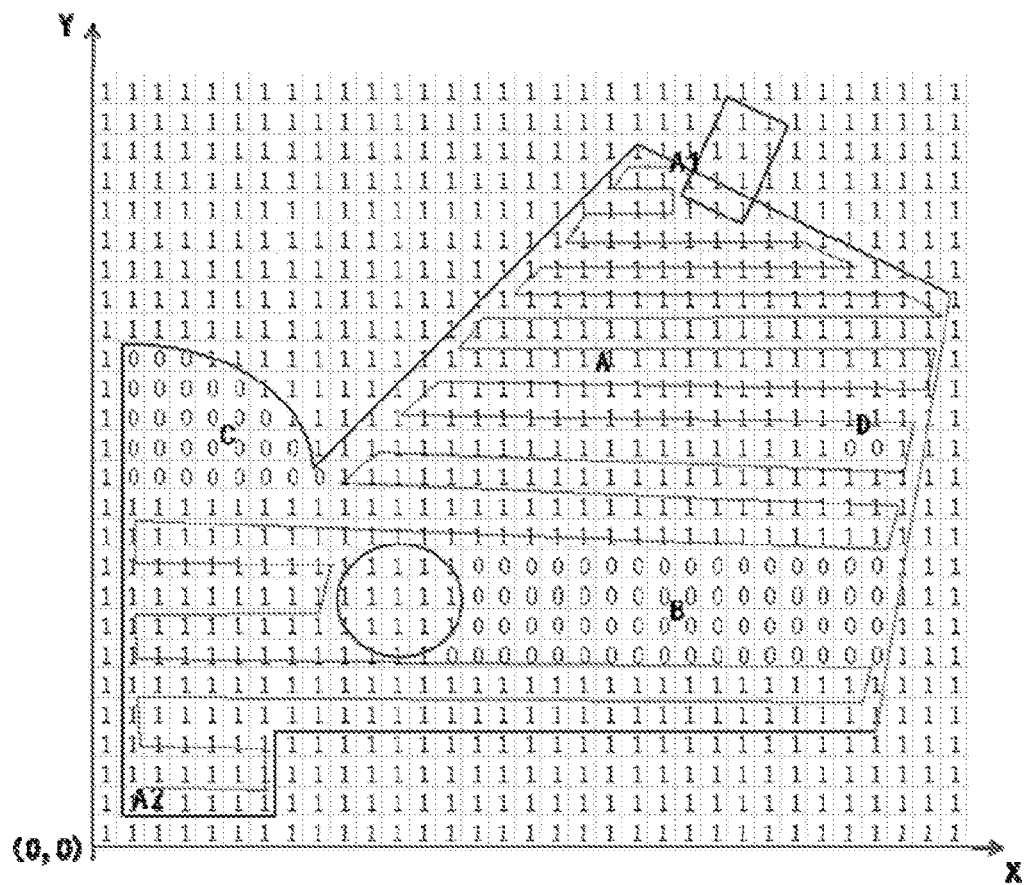
Figure 5B:
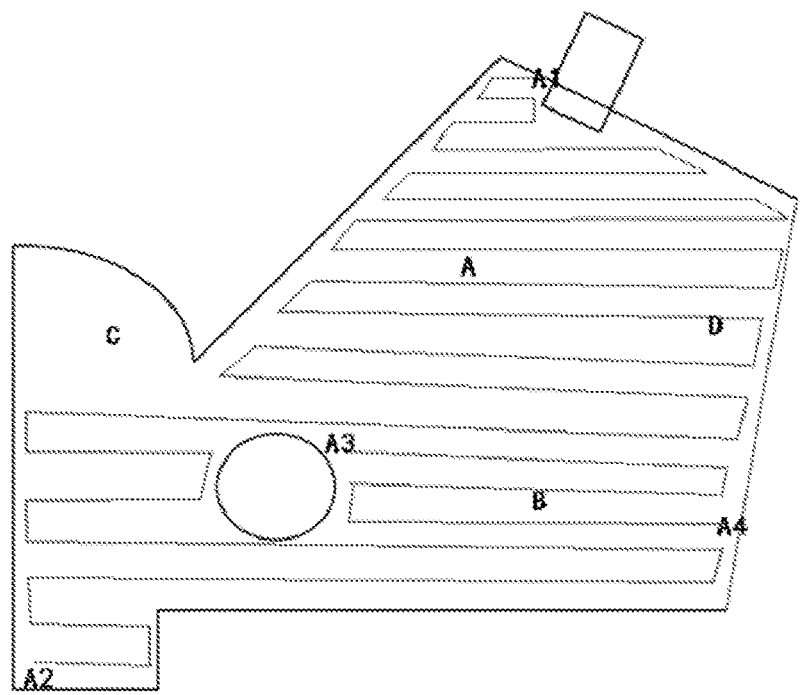
Figure 5C:
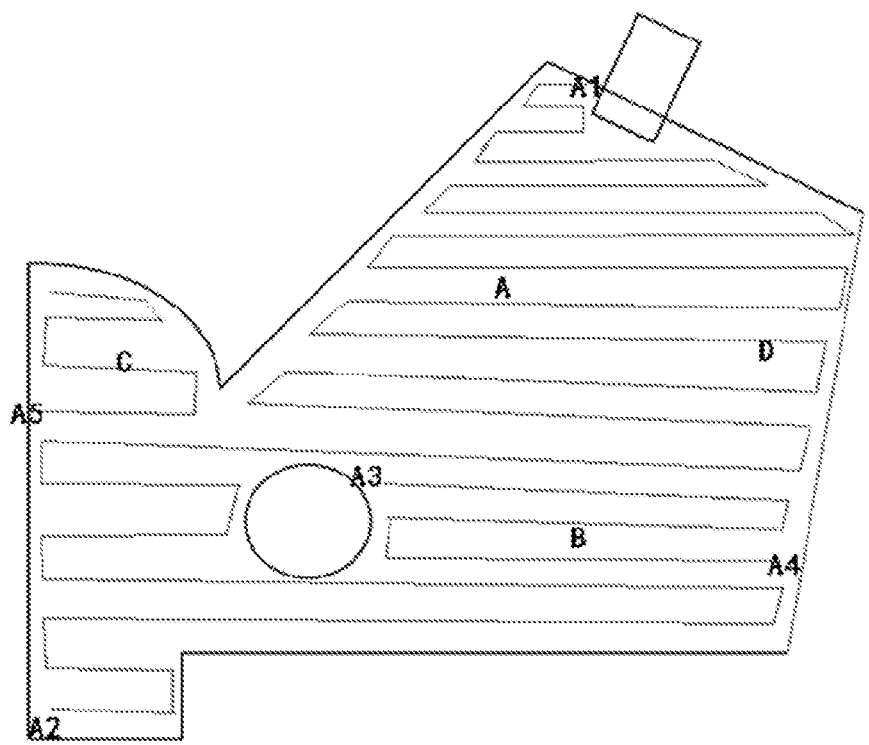

With reference to the first specific example of the present disclosure shown in FIGS. 5A, 5B, and 5C, in this specific example, first, as shown in FIG. 5A, a point A1, which is the closest to the charging station and has a maximum value y, is used as the starting point, and the robot is driven to the point A1 by global positioning and navigation, and horizontally traverses a region A in a bow-shaped manner by means of the built-in sensors until this manner cannot be continued for traversal; in this process, the traversed region is recorded by global positioning, and the identifiers of the grid cells in the traversed region are modified to "1". After the traversal of the region A is completed, it is confirmed that there are independent working regions in the working region, respectively region B, region C, and region D; the areas of regions B and C are both greater than a preset area threshold, the region D is a missed mowing region caused by the ups and downs of the lawn, uneven softness of the surface, density of grass, non-uniformity of parts, etc., and the area of the region D is less than the preset area threshold; thus, as shown in FIG. 5B, preset rules are further reselected to traverse only the region B and the region C; based on the current position of the robot, that is, the end position A2 of the first traversal, a point closest to the region A and having a maximum value Y is selected as the working start point A3 of the region B, and the robot continues to be driven to the point A3 by global positioning and navigation, and horizontally traverses the region B in the bow-shaped manner by means of the built-in sensors; as shown in FIG. 5C, after the traversal of the region B is completed, based on the current position of the robot, that is, the end position A4 of traversal of the region B, a point closest to the region B and having a maximum value Y is selected as the working start point A5 of the region C, and the robot continues to be driven to the point A5 by global positioning and navigation, and horizontally traverses the region C in the bow-shaped manner by means of the built-in sensors; and after the traversal of the region C is completed, there is no independent region the area of which is not less than the preset area threshold, it indicates that the traversal of this cycle is over, and the robot can be driven to return to the charging station to prepare for the traversal of the next working cycle.

Figure 6:
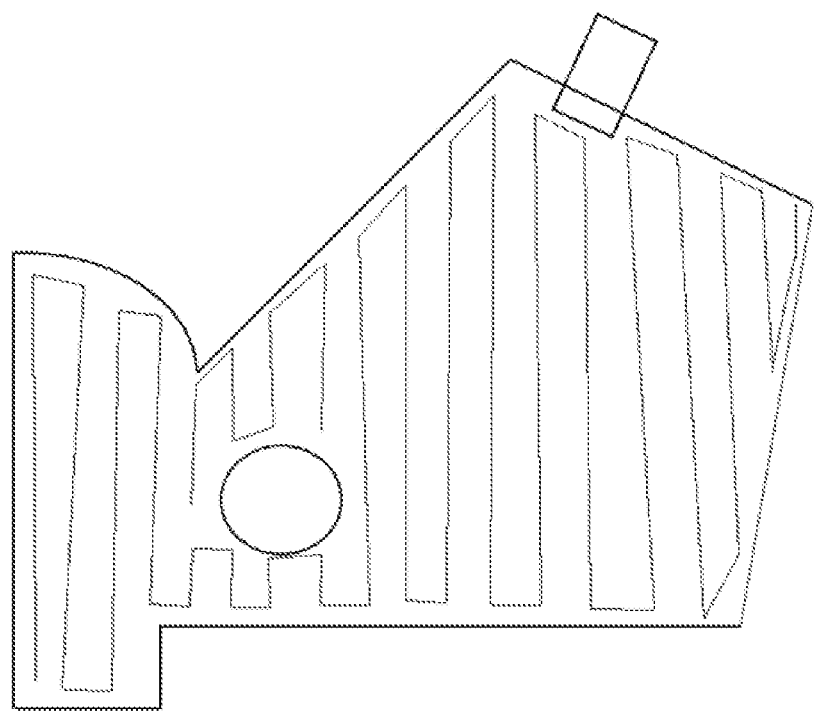

As shown in FIG. 6, the second specific example of the present disclosure shown in FIG. 6 is similar to the first specific example shown in FIGS. 5A, 5B, and 5C in traversal manner. The difference is that in FIG. 6, the entire working region is traversed in a vertical bow-shaped manner by means of the built-in sensors. In this example, the region A is traversed for the first time, and the region B is traversed for the second time. With reference to the first example and description shown in FIGS. 5A, 5B, and 5C, the specific traversal process of this example can be obtained undoubtedly, and details will not be further described here.

Figure 7A:
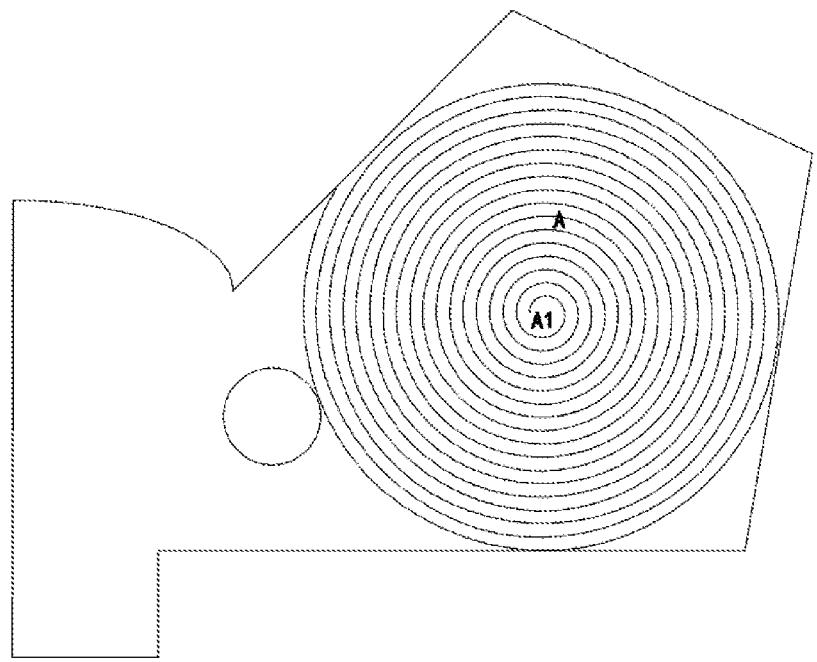
Figure 7B:
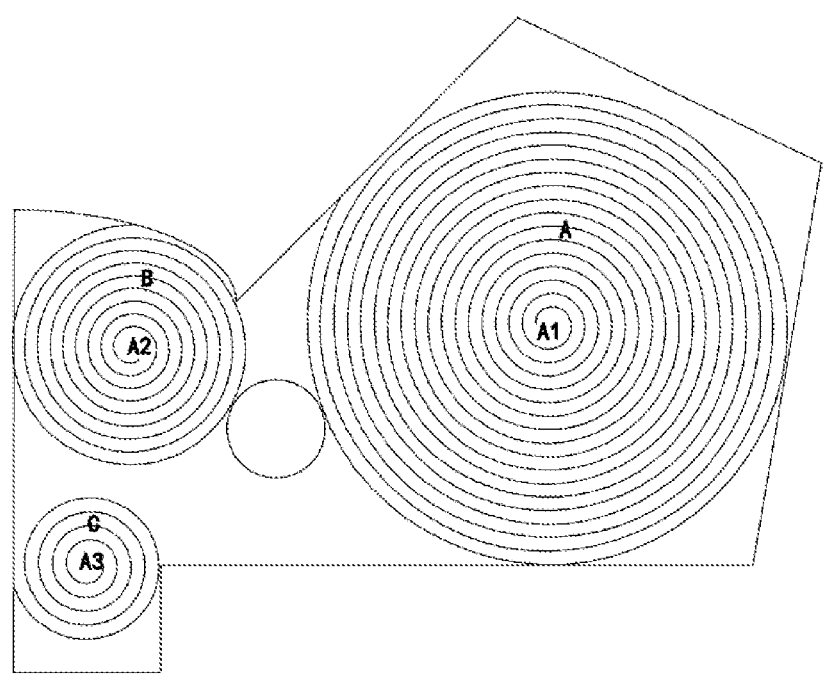
Figure 7C:
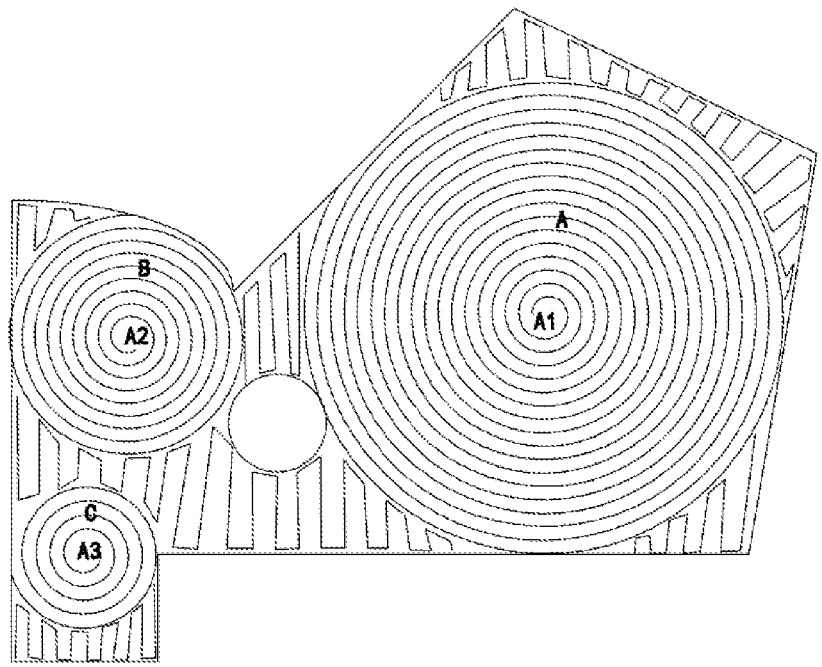

FIGS. 7A, 7B, and 7C show a third specific example of the present disclosure. In this specific example, first, as shown in FIG. 7A, the randomly selected preset rule is traversal in an outward spiral manner; and it is confirmed that the diameter of the inscribed circle of the current working region A is greater than a preset diameter threshold. Thus, the coordinate point A1 near the center of the inscribed circle is used as the starting point, and the robot is driven to the point A1 by global positioning and navigation, and traverses a region A in the outward spiral manner by means of the built-in sensors until this manner cannot be continued for traversal; in this process, the traversed region is recorded by global positioning, and the identifiers of the grid cells in the traversed region are modified to "1". After the traversal of the region A is completed, it is confirmed that there are still multiple independent working regions in the working region, and there are multiple independent working regions the areas of which are greater than a preset area threshold; as shown in FIG. 7B, the outward spiral manner is also selected for traversal, and it is confirmed that the diameters of the inscribed circles of the region B and the region C are greater than a preset diameter threshold; correspondingly, only the region B and the region C are traversed in the outward spiral manner, and coordinate points A2 and A3 near the centers of the inscribed circles are respectively selected as the working start points of the region B and the region C; as shown in FIG. 7C, after the traversal of the region B and the region C is completed, the areas of the remaining independent regions are all greater than the preset area threshold, and the diameter of each inscribed circle is less than the preset diameter threshold, so the remaining independent regions can only be traversed in the bow-shaped manner; in this way, the corresponding working start point is selected in each independent region, and the entire working region is traversed in the bow-shaped manner; and after FIG. 7C is formed, it indicates that the traversal of this cycle is over, and the robot can be driven to return to the charging station to prepare for the traversal of the next working cycle.

In an embodiment of the present disclosure, a robot is further provided, comprising a memory and a processor, the memory storing a computer program, and when the processor executes the computer program, the steps of the traversal method described above are implemented.

In an embodiment of the present disclosure, a readable storage medium is further provided, storing a computer program thereon, and when computer program executed by a processor, the steps of the traversal method described above are implemented.

Figure 8:
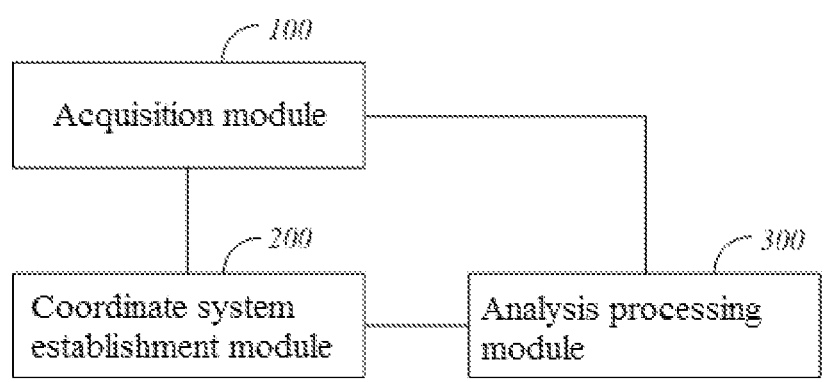
FIG. 8 is a schematic diagram of modules of a traversal system provided by an embodiment of the present disclosure.

With reference to FIG. 8, a traversal system is provided, the system comprising: an acquisition module 100, a coordinate system establishment module 200, and an analysis processing module 300.

The acquisition module 100 is configured to acquire a grid map, the grid map comprising a plurality of grid cells with the same structure, and the grid map being divided into a working region and a non-working region based on whether a robot works therein. The coordinate system establishment module 200 is configured to select any point within the plane in which the grid map is located as a coordinate origin of a rectangular coordinate system, and use the coordinate origin to establish the rectangular coordinate system covering the grid map. The analysis processing module 300 is configured to randomly select a coordinate point in the working region as a starting point if traversal is performed for the first time in the same working cycle, drive the robot to arrive at the starting point, and drive the robot, according to a randomly selected preset rule, traverse the working region where the starting point is located and work synchronously, the preset rule comprising: driving the robot to traverse the current working region in a bow-shaped manner or driving the robot to traverse the current working region in a spiral outward manner; when it is confirmed that the current preset rule applied to the first traversal cannot continue to be executed, acquire the area of each independent working region in the remaining working region; and if the area of any independent working region is not less than a preset area threshold, select any coordinate point as a working start point in the working region the area of which is not less than the preset area threshold, drive the robot to arrive at the working start point of the current working region, and starting from the working start point, randomly select the preset rule to perform traversal and work synchronously until the areas of all the independent working regions are less than the preset area threshold.

In addition, in a preferred embodiment of the present disclosure, the acquisition module 100 is also configured to implement step S1 above, the coordinate system establishment module 200 is also configured to implement step S2, and the analysis processing module 300 is also configured to implement step S3 and other steps that are not labeled.

Those skilled in the art can clearly understand that, for the convenience and brevity of the description, the specific working processes of the systems and modules described above may be referred to the corresponding processes in the foregoing method embodiments, which will not be repeated here.

To sum up, the traversal method and system, robot and readable storage medium of the present disclosure have the advantages that a working region is traversed in bow-shaped and spiral outward manners in combination with grid map coordinates in a rectangular coordinate system, and the remaining working region is checked according to the area and traversed, thereby forming an efficient traversal method, which ensures the coverage rate of the robot during traversal, helps to improve the efficiency of the robot during work, and effectively avoids missed mowing.

In the several embodiments provided in this application, it should be understood that the disclosed modules, systems and methods can all be implemented in other ways. The system embodiment described above is only illustrative. The division of the modules is only a logic function division, and other divisions may be used in practice. For example, a plurality of modules or components may be combined or integrated to another system, or some features may be neglected or not executed.

The modules described as separate components may be or may not be physically separated, and the components displayed as modules may be or may not be physical modules, that is, the components may be located at one place or may also be distributed on a plurality of network modules. Some or all of the modules may be selected according to actual requirements to achieve the objective of the solution in this embodiment.

In addition, each functional module in each embodiment of the present application may be integrated into one processing module, or each module may exist physically alone, or two or more modules may be integrated into one module. The integrated modules may be implemented in the form of hardware, or may be implemented in the form of hardware plus software function modules.

Finally, it should be noted that the above embodiments are only used to illustrate the technical solutions of the present application, but not to limit them; although the present application is described in detail with reference to the foregoing embodiments, those of ordinary skill in the art should understand that modifications can still be made to the technical solutions described in the foregoing embodiments, or equivalent substitutions can be made to some of the technical features; and these modifications or substitutions do not make the essence of the corresponding technical solutions deviate from the spirit and scope of the technical solutions of the embodiments of the present application.

The invention claimed is:

1. A traversal method, comprising:
   acquiring a grid map, the grid map including a plurality of grid cells with the same structure, and the grid map being divided into a working region and a non-working region based on whether a robot works therein;
   within the plane in which the grid map is located, selecting any point as a coordinate origin of a rectangular coordinate system, and using the coordinate origin to establish the rectangular coordinate system covering the grid map;
   if traversal is performed for the first time in the same working cycle, randomly selecting a coordinate point in the working region as a starting point;
   driving the robot to arrive at the starting point, and driving the robot to, according to a randomly selected preset rule, traverse the working region where the starting point is located and work synchronously; and
   when it is confirmed that the current preset rule applied to the first traversal cannot continue to be executed, acquiring the area of each independent working region in the remaining working region;
   if the area of any independent working region is not less than a preset area threshold, selecting any coordinate point as a working start point in the working region the area of which is not less than the preset area threshold, driving the robot to arrive at the working start point, and, starting from the working start point, randomly selecting the preset rule to perform traversal and work synchronously until the areas of all the independent working regions are less than the preset area threshold, and
   wherein when the randomly selected preset rule is traversal in a spiral outward manner, judging whether a diameter of an inscribed circle of a current working region is greater than a preset diameter threshold, if so, performing the traversal according to the selected preset rule, otherwise, changing the preset result to traversal in a bow-shaped manner, and traversing the current working region in the bow-shaped manner.

2. The traversal method according to claim 1, wherein the method further includes configuring the preset rule, the preset rule including:
   driving the robot to traverse the current working region in a bow-shaped manner or driving the robot to traverse the current working region in a spiral outward manner.

3. The traversal method according to claim 1, wherein "the grid map being divided into a working region and a non-working region based on whether a robot works therein" specifically includes:
   marking the grid map with any two different identifiers, the two identifiers being represented by a first identifier and a second identifier respectively;
   before the robot enters the grid map, the method further includes:
   marking each grid cell of the working region with the first identifier, and marking each grid cell of the non-working region with the second identifier;
   during the working process of the robot in the same working cycle, the method further includes:
   if the robot completes the work in any grid cell, modifying the identifier of the current grid cell from the first identifier to the second identifier.

4. The traversal method according to claim 1, wherein "within the plane in which the grid map is located, selecting any point as a coordinate origin of a rectangular coordinate system, and using the coordinate origin to establish the rectangular coordinate system covering the grid map" specifically includes:

selecting any point outside the grid map as the coordinate origin of the rectangular coordinate system, and using two mutually perpendicular straight lines that pass through the coordinate origin and divide the grid map into the same quadrant as an X-axis and a Y-axis of the rectangular coordinate system respectively.

5. The traversal method according to claim 4, wherein the method further includes:

selecting any point outside the grid map as the coordinate origin of the rectangular coordinate system, and using two mutually perpendicular straight lines that pass through the coordinate origin and divide the grid map into a first quadrant as an X-axis and a Y-axis of the rectangular coordinate system respectively.

6. The traversal method according to claim 1, wherein "within the plane in which the grid map is located, selecting any point as a coordinate origin of a rectangular coordinate system, and using the coordinate origin to establish the rectangular coordinate system covering the grid map" specifically includes:

using the stop position of the robot at a charging station as the coordinate origin; and using the open direction of the charging station for charging the robot as an X-axis, and the direction in which the X-axis is rotated 90° as a Y-axis, to establish the rectangular coordinate system.

7. The traversal method according to claim 1, wherein when the selected preset rule is driving the robot to traverse the current working region in a bow-shaped manner, the method for obtaining at least one of the starting point and the working start point includes:

selecting an extreme value coordinate point in the current working region as the starting point, the extreme value coordinate point including: a coordinate point with a minimum abscissa on the X-axis, a coordinate point with a maximum abscissa on the X-axis, a coordinate point with a minimum ordinate on the Y-axis, or a coordinate point with a maximum ordinate on the Y-axis.

8. The traversal method according to claim 1, wherein when the selected preset rule is driving the robot to traverse the current working region in a spiral outward manner, the method for obtaining at least one of the starting point and the working start point includes:

selecting a coordinate point closest to the center of the working region as the starting point.

9. The traversal method according to claim 1, wherein when the selected preset rule is driving the robot to traverse the current working region in a bow-shaped manner, the method for obtaining the working start point includes:

selecting a coordinate point closest to the current position of the robot in the current working region as the working start point.

10. The traversal method according to claim 1, wherein the method further includes:

at the beginning of a next working cycle, restoring original data in the grid map;

during first traversal, after the starting point of the previous working cycle is excluded from the current working region, selecting any coordinate point as the working start point of this working cycle;

or during first traversal, different from a traveling direction of the robot when the robot traverses for the first time in the previous working cycle, changing the traveling direction when the robot traverses for the first time in this working cycle;

or during first traversal, different from the preset rule selected when the robot traverses for the first time in the previous working cycle, changing the preset rule when the robot traverses for the first time in this working cycle.

11. A robot, comprising a memory and a processor, the memory storing a computer program, wherein when the processor executes the computer program, the steps of the traversal method according to claim 1 are implemented.

12. A non-transitory computer-readable storage medium, storing a computer program thereon, wherein when the computer program is executed by a processor, the steps of the traversal method according to claim 1 are implemented.

13. A traversal system, comprising:

an acquisition module, configured to acquire a grid map, the grid map including a plurality of grid cells with the same structure, and the grid map being divided into a working region and a non-working region based on whether a robot works therein;

a coordinate system establishment module, configured to select any point within the plane in which the grid map is located as a coordinate origin of a rectangular coordinate system, and use the coordinate origin to establish the rectangular coordinate system covering the grid map; and an analysis processing module, configured to:

randomly select a coordinate point in the working region as a starting point if traversal is performed for the first time in the same working cycle, drive the robot to arrive at the starting point, and drive the robot, according to a randomly selected preset rule, traverse the working region where the starting point is located and work synchronously, and when it is confirmed that the current preset rule applied to the first traversal cannot continue to be executed, acquire the area of each independent working region in the remaining working region;

if the area of any independent working region is not less than a preset area threshold, select any coordinate point as a working start point in the working region the area of which is not less than the preset area threshold, drive the robot to arrive at the working start point of the current working region, and corresponding to the current working region, starting from the working start point, randomly select the preset rule to perform traversal and work synchronously until the areas of all the independent working regions are less than the preset area threshold, and if the randomly selected preset rule is traversal in a spiral outward manner, judging whether a diameter of an inscribed circle of a current working region is greater than a preset diameter threshold, if so, performing the traversal according to the selected preset rule, otherwise, changing the preset result to traversal in a bow-shaped manner, and traversing the current working region in the bow-shaped manner.

* * * * *